United States Patent
Chung et al.

(10) Patent No.: US 6,655,420 B1
(45) Date of Patent: Dec. 2, 2003

(54) VACUUM WATER MAKING METHOD AND DEVICE THEREOF

(76) Inventors: Wen Hui Chung, No. 16, Hsin Cheng N. Rd., Su Ao Jen, I Lan Hsien (TW); Chih-Chao Choung, No. 16, Hsin Cheng N. Rd., Su Ao Hen, I Lan Hsien (TW)

(*) Notice: Subject to any disclaimer, the term of this patent is extended or adjusted under 35 U.S.C. 154(b) by 0 days.

(21) Appl. No.: 10/244,543

(22) Filed: Sep. 17, 2002

(51) Int. Cl.⁷ .............................................. B65B 1/04
(52) U.S. Cl. ............................. 141/82; 141/1; 141/97; 141/85; 222/146.6; 53/432; 53/510
(58) Field of Search .............................. 141/82, 2, 18, 141/97, 98, 85, 1; 53/432, 510; 222/146.1–146.6; 210/192, 205

(56) References Cited

U.S. PATENT DOCUMENTS 5,896,727 A * 4/1999 Egli et al. ..................... 53/426
6,149,804 A * 11/2000 Chung et al. ............... 210/192
6,228,259 B1 * 5/2001 Schwartz et al. ........ 210/198.1

* cited by examiner

Primary Examiner—Steven O. Douglas
(74) Attorney, Agent, or Firm—Browdy and Neimark, P.L.L.C.

(57) ABSTRACT

A vacuum water making method and device, the vacuum water making device comprises a water storage tank, a first gas extraction pipeline, a vacuum container connected to one end of the first gas extraction pipeline and the water storage tank, an intake pipeline disposed in the vacuum container, a mild water temperature control portion disposed between the intake pipeline and the water storage tank, a bottle filling injection pipeline with one end connected to the water storage tank, and an isopiestic continuous room disposed below the bottle filling injection pipeline. The vacuum water is produced by said device.

16 Claims, 2 Drawing Sheets

```
filtering and sterilizing water and
keeping the water at the room
temperature
```
↓
```
water into a vacuum container and
guiding oxygen and hydrogen in the
water out to form vacuum water
```
↓
```
performing the operation of bottle
filling through an isopiestic
continuous room
```

FIG. 1

VACUUM WATER MAKING METHOD AND DEVICE THEREOF

BACKGROUND OF THE INVENTION

1. Field of the Invention

The present invention relates to a vacuum water making method and a device thereof and, more particularly, to a making method and a device thereof for providing vacuum water, which has no oxygen therein and thus will not breed bacteria and be oxidized.

2. Description of Related Art

Water is colorless and odorless transparent liquid, and is a compound of hydrogen and oxygen. Water is a kind of indispensable resources on earth, and can be drunk by humans to replenish the required water content for the body. Moreover, it can provide various kinds of usages like cleaning.

However, oxygen easily dissolves into water to breed bacteria, hence resulting in pollution of water. If water is to be directly drunk, there is unavoidable doubt of sanitation. Moreover, water easily reacts with other chemical components to more limit its use.

Accordingly, conventional water has inconvenience and drawbacks in practical use. The present invention aims to resolve the problems in the prior art.

SUMMARY OF THE INVENTION

The primary object of the present invention is to provide a vacuum water making method and a device thereof, which can make vacuum water without oxygen dissolving therein so that bacteria will not breed therein. The vacuum water can thus be directly drunk, and will not react with other chemical components.

To achieve the above object, the present invention provides a vacuum water making method, which comprises the steps of (a) a water being filtered and sterilized and kept at the room temperature; (b) guiding the water into a vacuum container and separating oxygen and hydrogen from the water to form vacuum water, and performing the operation of heating to control the water temperature at 5~20° C.; (c) performing the operation of bottle filling through an isopiestic continuous room.

The present invention also provides a vacuum water making device, which comprises a water storage tank, a first gas extraction pipeline, a vacuum container connected to one end of the first gas extraction pipeline and also connected to the water storage tank, an intake pipeline disposed in the vacuum container, a mild water temperature control portion disposed between the intake pipeline and the water storage tank, a bottle filling injection pipeline whose one end is connected to the water storage tank, and an isopiestic continuous room disposed below the bottle filling injection pipeline.

The various objects and advantages of the present invention will be more readily understood from the following detailed description when read in conjunction with the appended drawings, in which:

BRIEF DESCRIPTION OF THE DRAWINGS

FIG. 1 is a flowchart of a vacuum water making method of the present invention.

DETAILED DESCRIPTION OF THE PREFERRED EMBODIMENTS

Figure 2:
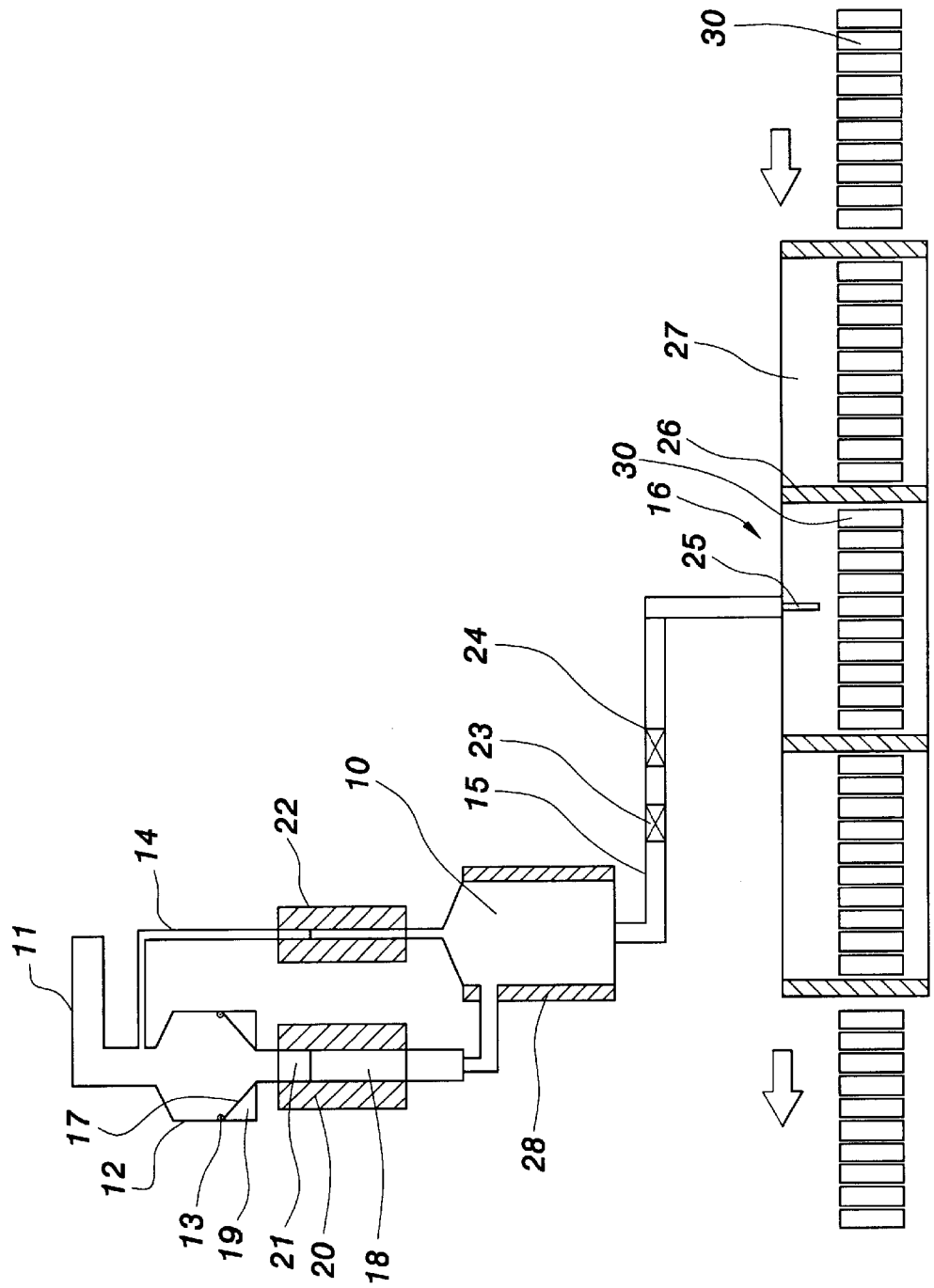
FIG. 2 is a diagram of a vacuum water making device of the present invention.

As shown in FIG. 1, a vacuum water making method of the present invention comprises the following steps.

(a) First, water is filtered and sterilized (like sterilization by high temperature), and is kept at the room temperature;

(b) Next, the water is guided into a vacuum container with oxygen and hydrogen in the water guided out, thereby forming vacuum water. The operation of heating is then performed to control the water temperature at 5~20° C. so as to prevent the water from freezing due to temperature drop when the vacuum container is vacuumed; and (c) Finally, the operation of bottle filling is performed through an isopiestic continuous room.

As shown in FIG. 2, a vacuum water making device of the present invention comprises a water storage tank 10, a first gas extraction pipeline 11, a vacuum container 12, an intake pipeline 13, a second gas extraction pipeline 14, a bottle filling injection pipeline 15, and a continuous room 16. The water storage tank 10 is a hollow airtight container, and can be used to receive the made vacuum water therein. The upper end of the water storage tank is pyramidical. A temperature control device 28 is disposed at the outside of the water storage tank 10. The temperature control device 28 can properly heat to control the temperature of water at 1~5° C. so as to less convert the water in the water storage tank 10 into gas and thus enhance the stability thereof.

The first gas extraction pipeline 11 is disposed above the water storage tank 10. The upper end of the vacuum container 12 is connected to one end of the first gas extraction pipeline 11. The cross-sectional area of the vacuum container 12 is larger than that of the first gas extraction pipeline 11. The upper end of the vacuum container 12 is pyramidical. A pyramidical guide plate 17 is disposed at the bottom of the vacuum container 12 to uniformly guide in water.

The bottom of the vacuum container 12 is connected to near the upper end of the sidewall of the water storage tank 10 via a connection pipeline 18. Gas in the vacuum container 12 can be extracted out through the first gas extraction pipeline 11 to vacuum the inside of the vacuum container 12, hence guiding out oxygen and hydrogen of the water in the vacuum container 12 to form vacuum water.

The intake pipeline 13 is disposed in the vacuum container 12. The other end of the intake pipeline 13 can be connected to a water source to guide in water. The intake pipeline 13 is located at a high point of the guide plate 17 to guide water flowing out of the intake pipeline 13 into the water storage tank 10 via the guide plate 17.

A second mild water temperature control portion 19 is disposed below the guide plate 17. A first mild water temperature control portion 20 and a water level control portion 21 are disposed on the connection pipeline 18. The second and first mild water temperature control portions 19 and 20 are disposed between the intake pipeline 13 and the water storage tank 10. The first and second mild water temperature control portions 19 and 20 can properly heat to control the water temperature at 5~20° C., thereby preventing water from freezing due to temperature drop when the vacuum container 12 is vacuumed. Additionally, water can be extracted out by the water level control portion 21 to control the water level.

The cross-sectional area of the second gas extraction pipeline 14 is smaller than that of the first gas extraction pipeline 11. One end of the second gas extraction pipeline 14 is connected to the upper end of the water storage tank 10, and the other end thereof is connected to the lower end of the first gas extraction pipeline 11. Gas in the water storage tank 10 can be extracted out via the first and second gas extraction pipelines 11 and 14.

A third mild water temperature control portion 22 is disposed on the second gas extraction pipeline 14. The third mild water temperature control portion 22 can be used to control the water temperature at 5~20° C.

One end of the bottle filling injection pipeline 15 is connected to the lower end of the water storage tank 10. A valve 23 and a bottle filling pump 24 are disposed on the bottle filling injection pipeline 15. The other end the bottle filling injection pipeline 15 has an injection mouth 25. Opening and closing of the valve 23 can be used to control outflow and stop of the vacuum water, respectively. The bottle filling pump 24 can extract the vacuum water in the water storage tank 10 into a bottle 30.

The continuous room 16 is an isopiestic continuous room, whose inside is partitioned into a plurality of receiving spaces 27 by a plurality of valves 26. The receiving spaces 27 are vacuumed to form isopiestic vacuum state. The continuous room 16 is disposed below the bottom filling injection pipeline 15. The bottles 30 can be continuously sent into the continuous room 16 with a conveyer. Vacuum water is injected into the bottle 30 via the injection mouth 25 of the bottle filling injection pipeline 15 to perform the operation of bottle filling. Because vacuum water has no compression ratio, it can fill the whole bottle 30 and be sealed therein. Sterility of the vacuum water can be kept until the bottle is opened.

To sum up, the vacuum water made by the present invention has no oxygen dissolving therein so that bacteria will not breed and survive therein. Therefore, it can be directly drunk, will not react with other chemical components, and is suitable to making drugs or additives.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A vacuum water making method comprising the steps of:
   (a) a water being filtered and sterilized and kept at the room temperature;
   (b) guiding the water into a vacuum container and separating oxygen and hydrogen from the water to form vacuum water, and keeping the water temperature at 5~20° C.;
   (c) performing an operation of bottle filling through an isopiestic continuous room.

2. A vacuum water making device comprising:
   a water storage tank;
   a first gas extraction pipeline;
   a vacuum container connected to one end of said first gas extraction pipeline and also connected to said water storage tank;
   an intake pipeline disposed in said vacuum container;
   a first mild water temperature control portion disposed between said intake pipeline and said water storage tank;
   a bottle filling injection pipeline, one end of the bottle filling injection pipeline being connected to said water storage tank; and
   an isopiestic continuous room disposed below said bottle filling injection pipeline.

3. The vacuum water making device as claimed in claim 2, wherein a temperature control device is disposed at an outside of said water storage tank.

4. The vacuum water making device as claimed in claim 2, wherein said first gas extraction pipeline is disposed above said water storage tank.

5. The vacuum water making device as claimed in claim 2, wherein an upper end of said vacuum container is connected to one end of said first gas extraction pipeline.

6. The vacuum water making device as claimed in claim 2, wherein the cross-sectional area of said vacuum container is larger than that of said first gas extraction pipeline.

7. The vacuum water making device as claimed in claim 2, wherein an upper end of said vacuum containers pyramidical, and a pyramidical guide plate is disposed at a bottom of said vacuum container.

8. The vacuum water making device as claimed in claim 7, wherein said intake pipeline is located at a high point of said guide plate.

9. The vacuum water making device as claimed in claim 7, wherein a second mild water temperature control portion is disposed below said guide plate.

10. The vacuum water making device as claimed in claim 2, wherein a bottom of said vacuum container is connected to an upper end of a sidewall of said water storage tank via a connection pipeline.

11. The vacuum water making device as claimed in claim 10, wherein a water level control portion is disposed on said connection pipeline.

12. The vacuum water making device as claimed in claim 2 further comprising a second gas extraction pipeline, a cross-sectional thereof being smaller than that of said first gas extraction pipeline, one end of said second gas extraction pipeline being connected to an upper end of said water storage tank, and the other end thereof being connected to a lower end of said first gas extraction pipeline.

13. The vacuum water making device as claimed in claim 12, wherein a third mild water temperature control portion is disposed on said second gas extraction pipeline.

14. The vacuum water making device as claimed in claim 2, wherein one end of said bottle filling injection pipeline is connected to a lower end of said water storage tank.

15. The vacuum water making device as claimed in claim 2, wherein a valve and a bottle filling injection pump are disposed on said bottle filling injection pipeline.

16. The vacuum water making device as claimed in claim 2, wherein said isopiestic continuous room is partitioned into a plurality of receiving spaces of vacuum state by a plurality of valves.

* * * * *